R. P. ADAMS.
VALVE CAP FOR PNEUMATIC TIRES.
APPLICATION FILED AUG. 25, 1919.
1,346,073.
Patented July 6, 1920.
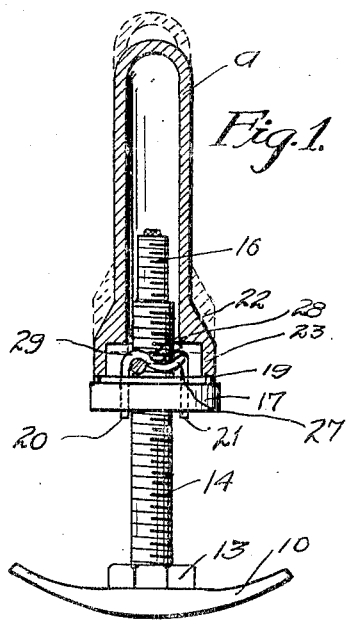
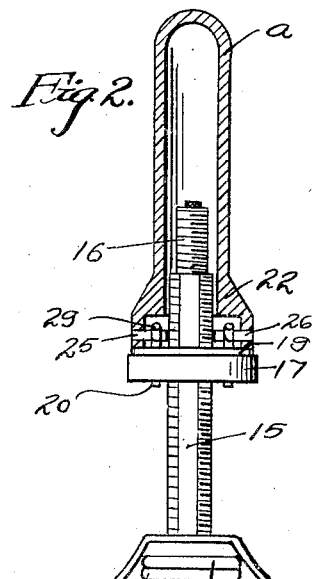
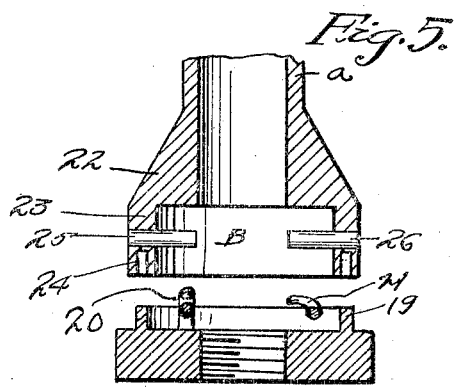
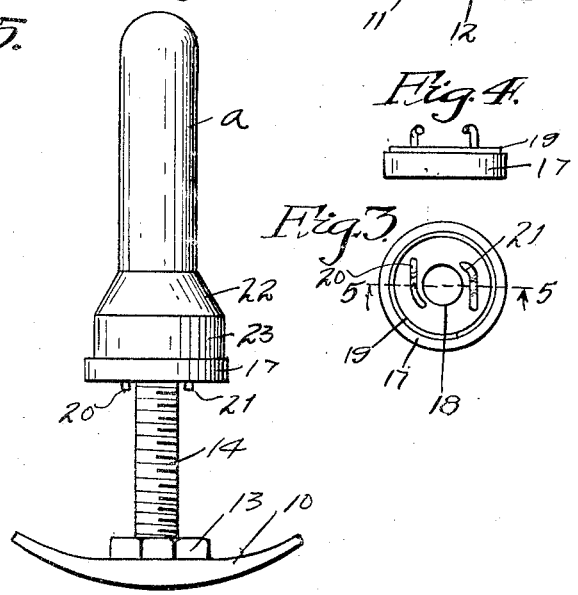
Witness
A. E. Jarvis
Inventor
Ray P. Adams
BY Orwig & Bair Attys

UNITED STATES PATENT OFFICE.

RAY P. ADAMS, OF LOHRVILLE, IOWA.

VALVE-CAP FOR PNEUMATIC TIRES.

1,346,073.          Specification of Letters Patent.          Patented July 6, 1920.

Application filed August 25, 1919. Serial No. 319,843.

*To all whom it may concern:*

Be it known that I, RAY P. ADAMS, a citizen of the United States, and resident of Lohrville, in the county of Calhoun and State of Iowa, have invented a certain new and useful Valve-Cap for Pneumatic Tires, of which the following is a specification.

The object of my invention is to provide a valve cap for pneumatic tires of simple, durable and inexpensive construction.

A further object of my invention is to provide a cap for the valve stem casing in use in connection with pneumatic tires, which is not likely to become accidentally displaced and therefore lost.

A further object of my invention is to provide a cap adapted to coact with parts of a valve stem casing, which is arranged to accomplish the function of keeping the dust out of the casing, but which may be readily attached or detached when it is desired to inflate the tire or inspect the valve.

With these and other objects in view, my invention consists in the construction, arrangement and combination of the various parts of the device, whereby the objects contemplated are attained, as hereinafter more fully set forth, pointed out in my claims and illustrated in the accompanying drawings, in which:

Figure 1 shows an elevation of a valve stem casing having my improved device fixed thereto, the cap being shown in section to better illustrate the construction.

Fig. 2 shows a similar view in which the device has been rotated through 90 degrees upon a vertical axis.

Fig. 3 is a top or plan view of a washer used in connection with my device.

Fig. 4 shows an elevation of the washer shown in Fig. 3.

Fig. 5 is an enlarged, sectional view taken on the line 5—5 of Fig. 3; and

Fig. 6 illustrates my improved cap after it has been fixed to the valve stem casing.

Referring to the accompanying drawings, I have used the reference numeral 10 to indicate generally a plate having washers 11 and 12, and a nut 13 disposed adjacent thereto on a valve casing 14, whereby the inner tube of a pneumatic tire may be sealed to the stem or casing 14.

The casing 14 is provided with external screw threads throughout the larger portion of its length and has oppositely faced off or flat portions 15, whereby rotation of the casing may be prevented when the casing is inserted through the opening in the rim of a wheel.

The upper end of the casing 14 is contracted at 16 and threaded to coact with a cap, which is not here shown. A washer or disk 17 has a central threaded opening 18 adapted to coact with the threads on the casing 14, so that it may be moved up and down thereof. The washer or disk 17 may have flattened or knurled edges, so that it may be gripped by a wrench or pliers. Adjacent to the edge of the washer 17 is an annular upwardly extending flange 19. Between the flange 19 and the opening 18 are a pair of wires 20 and 21 which extend through the washer 17 and are fixed therein.

The upper ends of the wires 20 and 21 are bent over to a position substantially perpendicular to the portion which extends through the washer 17. This bent over portion is further bent to form a reverse curve for a purpose which will hereinafter be described.

It will be understood that when air is to be pumped into the inner tube of the tire, then the air tube must be secured in some suitable way to the contracted portion 16 of the casing 14, so that air may be forced down through the central opening in the casing 14 into the inner tube. Valve members are provided in the casing 14, which are of usual construction and therefore not further shown or described herein.

If, however, the upper end of the casing 14 is allowed to remain open then the valve may be damaged or rendered ineffective and means are provided for protecting the valve, comprising a cap member "*a*" having an elongated, hollow, cylindrical portion closed at its upper end, a flared portion 22 adjacent to its lower end which terminates in a downwardly extending annular flange 23. The flange 23 is provided with an upwardly extending annular channel 24 in its lower edge adapted to receive and engage the flange 19 to thereby form a substantially air-tight joint between the cap "*a*" and the disk 17.

The flared portion 22 of the cap "*a*" forms an enlarged recess "B" at the bottom of the cap for a purpose which will hereinafter be made clear.

A pair of pins 25 and 26 are fixed into the flange 23 and have one end extended into the recess "B". When the cap member is placed down over the washer 17, as is shown in Figs. 1, 2, and 6, the parts are so arranged that the pins 25 and 26 are in a horizontal plane spaced somewhat below the major portion of the bent over portion of the wires 20 and 21.

Referring to Fig. 3, it will be seen that these wires 20 and 21 are so arranged that the bent over portion does not extend clear around the washer, but instead leaves an open place, so that the pins 25 and 26 will not interfere with the flange 19 seating in the channel 24.

If, however, the cap member be then rotated, the pins 25 and 26 will engage the turned-up end 27 of the wires 20 and 21, so that continued rotation of the cap will force the wires up to the position shown in dotted lines at 28 in Fig. 1. Further rotation of the cap will cause the pins 25 and 26 to seat themselves in the hook-shaped portion 29 of the wires 20 and 21, so that the pins will be positively held from movement in one direction, and will be yieldingly held from movement in the other direction.

At the same time, the engagement of the pins 25 and 26 with the wires 20 and 21 will hold the cap "a" from movement in any direction, unless a positive force is exerted against it to rotate it, so that the pins may be moved out from the wires against the yielding resistance of the wires.

The opening at the top of the cap "a," which receives the casing 14 is of such size that it will closely engage the casing, when the cap is in engagement with the disk or washer 17 to thereby prevent lateral vibration of the cap relative to the casing, and the consequent tendency for the vibration to cause the springs 20 and 21 to crystallize.

An advantage in this construction resides in the fact that in order to remove my improved cap from the valve stem, it is necessary to rotate the cap in exactly the right direction and to use a definite amount of force. As the cap "a" is provided with a smooth outer surface and has no projecting corners, which would be likely to catch anything, so that it would be rotated, and as the ordinary vibrations and jars of the wheel do not have the slightest tendency to rotate the cap, it will be seen that it is substantially impossible for my cap to be displaced, except by the intentional rotation of the cap.

Some changes may be made in the construction and arrangement of the parts of my improved device, without departing from the essential features and purpose of my invention, and it is my intention to cover by my claims any modified forms of structure or use of mechanical equivalents, which may be reasonably included within their scope.

I claim as my invention:

1. In a device of the class described, a casing having external screw threads thereon, a washer having a central opening therein threaded to coact with the threads of the casing, wires of resilient material having one end secured into the washer, and central portions bowed to form a hook member and their other ends curved in the reverse direction relative to the curve of the hooked portions, a cap member having a central, longitudinal opening therein adapted to receive the extending end of the casing and an enlarged recess adjacent to the open end of the cap, and pins fixed into said cap and extended into the recess, whereby said pins may engage the bent portions of the wires to hold the cap from movement relative to the washer.

2. In a device of the class described, a casing, a washer mounted on said casing, a cap member having an elongated central opening therein adapted to receive the extending end of the casing, pins fixed to the cap and extended into said opening and resilient hook devices fixed to the washer and adapted to engage said pins, whereby said hook devices may yieldingly hold the cap from movement in one direction and may positively prevent its movement in any other direction.

3. In a device of the class described, a casing, a washer having a central opening therein adapted to receive said casing, said washer having an upwardly extending annular flange formed on its upper surface in position spaced inwardly from its outer edges, a cap member having a longitudinal opening therein, designed to receive the extending end of the casing and a channel formed in its lower edge adapted to receive said flange, pins fixed to the cap and extended into said opening and resilient hook members fixed to the washer in such position that rotation of the cap when the flange is received in said channel will cause the pins to enter said hook devices, so that the former may be both yieldingly held from movement in one direction relative to the latter, and may be positively held from movement in any other direction by the latter.

Des Moines, Iowa, August 18, 1919.

RAY P. ADAMS.